US009473511B1

(12) United States Patent
Arunkumar et al.

(10) Patent No.: US 9,473,511 B1

(45) **Date of Patent: *Oct. 18, 2016**

(54) GEOGRAPHICAL LOCATION AUTHENTICATION

(71) Applicant: International Business Machines Corporation, Armonk, NY (US)

(72) Inventors: Saritha Arunkumar, Basingstoke (GB); Raghu K. Ganti, White Plains, NY (US); Stephen D. Pipes, Southampton (GB); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,570

(22) Filed: Mar. 21, 2016

Related U.S. Application Data

(63) Continuation of application No. 14/671,035, filed on Mar. 27, 2015.

(51) Int. Cl.
*H04L 29/06* (2006.01)

(52) U.S. Cl.
CPC ............. *H04L 63/107* (2013.01); *H04L 63/20* (2013.01)

(58) Field of Classification Search
CPC ................. H04L 63/20; H04L 63/107; G06F 2221/2111
See application file for complete search history.

(56) References Cited

U.S. PATENT DOCUMENTS 9,208,301 B2 12/2015 Grigg et al.
9,253,198 B2 2/2016 Hughes, Jr. et al.

FOREIGN PATENT DOCUMENTS

EP 1329056 B1 7/2011

OTHER PUBLICATIONS

Matheus (Open Geospatial Consortium Pub. Date: May 12, 2011, 55 pages).*

* cited by examiner

*Primary Examiner* — Saleh Najjar
*Assistant Examiner* — Oleg Korsak
(74) *Attorney, Agent, or Firm* — Bryan D. Wells; Daniel R. Simek

(57) ABSTRACT

The method includes identifying a computing device attempting to access content. The method further includes identifying a defined geographical boundary that is associated with the content, wherein the defined geographical boundary includes coordinates that define a geographical area that allows access to the content within the defined geographical boundary. The method further includes determining a geographical location of the computing device. The method further includes determining whether the geographical location of the computing device is within the identified defined geographical boundary.

1 Claim, 7 Drawing Sheets

```
<Policy PolicyId="ExamplePolicy"
RuleCombiningAlgId="urn:oasis:names:tc:xacml:1.0:rule-combiningalgorithm:
permit-overrides">
<Target>
<Subjects>
<AnySubject/>
</Subjects>
<Resources>
<Resource>
<ResourceMatch MatchId="urn:oasis:names:tc:xacml:1.0:function:anyURIequal">
<AttributeValue
DataType="http://www.w3.org/2001/XMLSchema#anyURI">patientlist</
AttributeValue>
<ResourceAttributeDesignator
DataType="http://www.w3.org/2001/XMLSchema#anyURI"
AttributeId="urn:oasis:names:tc:xacml:1.0:resource:resource-id"/>
</ResourceMatch>
</Resource>
</Resources>
<Actions>
<AnyAction/>
</Actions>
</Target>
<Rule RuleId="ReadRule" Effect="Permit">
<Target>
<Subjects>
<AnySubject/>
</Subjects>
<Resources>
<AnyResource/>
</Resources>
<Actions>
<Action>
<ActionMatch MatchId="urn:oasis:names:tc:xacml:1.0:function:stringequal">
<AttributeValue
DataType="http://www.w3.org/2001/XMLSchema#string">read</AttributeValue>
<ActionAttributeDesignator
DataType="http://www.w3.org/2001/XMLSchema#string"
AttributeId="urn:oasis:names:tc:xacml:1.0:action:action-id"/>
</ActionMatch>
</Action>
</Actions>
</Target>
</Rule>
</Policy>
```

FIG. 4

```
<Policy PolicyId="ExamplePolicy"
RuleCombiningAlgId="urn:oasis:names:tc:xacml:1.0:rule-combiningalgorithm:
permit-overrides">
<Target>
<Subjects>
<AnySubject/>
</Subjects>
<Resources>
<Resource>
<ResourceMatch MatchId="urn:oasis:names:tc:xacml:1.0:function:anyURIequal">
<AttributeValue
DataType="http://www.w3.org/2001/XMLSchema#anyURI">patientlist</
AttributeValue>
<ResourceAttributeDesignator
DataType="http://www.w3.org/2001/XMLSchema#anyURI"
AttributeId="urn:oasis:names:tc:xacml:1.0:resource:resource-id"/>
</ResourceMatch>
</Resource>
</Resources>
<Actions>
<AnyAction/>
</Actions>
</Target>
<Rule RuleId="ReadRule" Effect="Permit">
<Target>
<Subjects>
<AnySubject/>
</Subjects>
<Resources>
<AnyResource/>
</Resources>
<Actions>
<Action>
<ActionMatch MatchId="urn:oasis:names:tc:xacml:1.0:function:stringequal">
<AttributeValue
DataType="http://www.w3.org/2001/XMLSchema#string">read</AttributeValue>
<ActionAttributeDesignator
DataType="http://www.w3.org/2001/XMLSchema#string"
AttributeId="urn:oasis:names:tc:xacml:1.0:action:action-id"/>
</ActionMatch>
</Action>
</Actions>
</Target>
<Condition FunctionId="urn:oasis:names:tc:xacml:1.0:function:and">
<ApplyFunctionId="geo-contains">
<Apply FunctionId="geoPoint-one-and-only">
<SubjectAttributeDesignator AttributeId="location"
DataType="geoPoint"/>
</Apply>
<AttributeValue
DataType="geoPolygon">41.027514,29.189435;41.029514,29.189435;41.029514
,29.191435;41.027514,29.191435;41.027514,29.189435</AttributeValue>
</Apply>
</Condition>
</Rule>
</Policy>
As
```

SECTION 502

FIG. 5

SECTION 602

```
<Request>
 <Subjcct>
  <Attribute AttributeId="location"
      DataType= "geoPoint">
  <AttributeValue>41.028514,29.190435</AnributeValue>
 </Attribute>
</Subject>
<Resource>
  <Attribute
Attribute="urn:oasis:names:tc:xacml:1.0:resource:resource-id"
      DataType="http://www.w3.org/2001/XML.Schema#anyURI">
   <AttributeValue>patient-lisl</AttributeValue>
  </Attribute>
</Resource>
<Action>
<Attribute AttributeId="urn:oasis:names:tc:xacml:1.O:action:action-id"
     DataType="http://www.w3.org/2001/XML.Schema#string">
   <AttributeValue>rcad</AttributeValue>
  </Attribute>
 </Action>
</Reqllest>
```

FIG. 6

GEOGRAPHICAL LOCATION AUTHENTICATION

STATEMENT REGARDING FEDERALLY SPONSORED RESEARCH OR DEVELOPMENT

This invention was made with Government support under contract number W911NF-06-3-001 awarded by the Army Research Office (ARO). The Government has certain rights to this invention.

BACKGROUND OF THE INVENTION

The present invention relates generally to extinguishable access control markup language (XACML), and more particularly to authentication based on geographical locations.

XACML stands for "eXtensible Access Control Markup Language." The standard defines a declarative access control policy language implemented in extensible markup language (XML) and a processing model describing how to evaluate access requests according to the rules defined in policies.

As a published standard specification, one of the goals of XACML is to promote common terminology and interoperability between access control implementations by multiple vendors. XACML is primarily an Attribute Based Access Control system (ABAC), where attributes (e.g., bits of data) associated with a user, action, or resource are inputs into the decision of whether a given user may access a given resource in a particular way. Role-based access control (RBAC) can also be implemented in XACML as a specialization of ABAC.

Electronic authentication, also referred to as e-authentication, is the process of establishing confidence in user identities electronically presented to an information system. Authentication is a process closely related to identification. In online environments, the username identifies the user, while the password authenticates that the user is whom he claims to be. E-authentication presents a technical challenge when this process involves the remote authentication of individual people over a network for the purpose of electronic government and commerce.

SUMMARY

Embodiments of the present invention disclose a method, computer program product, and system for authentication. In one embodiment, in accordance with the present invention, the computer-implemented method includes identifying a computing device attempting to access content. The method further includes identifying a defined geographical boundary that is associated with the content, wherein the defined geographical boundary includes coordinates that define a geographical area that allows access to the content within the defined geographical boundary. The method further includes determining a geographical location of the computing device. The method further includes determining whether the geographical location of the computing device is within the identified defined geographical boundary.

BRIEF DESCRIPTION OF THE DRAWINGS

FIG. 4 depicts a generic XACML format, in accordance with an embodiment of the present invention;

FIG. 5 depicts an XACML format which includes geospatial parameters, in accordance with an embodiment of the present invention;

FIG. 6 depicts received data in an XACML format that indicates the geospatial location of a client device which is trying to access secure information, in accordance with an embodiment of the present invention;

DETAILED DESCRIPTION

Embodiments of the present invention recognize that it may be desirable to permit or deny access to secure information based upon the originating location. Another layer of security can be added by checking the location a request originates from to gain access to secure and/or sensitive information. Embodiments of the present invention recognize that the geographical location from which a request to access secure information originates from will help to verify access secure and/or privileged information.

Implementation of embodiments of the invention may take a variety of forms, and exemplary implementation details are discussed subsequently with reference to the Figures.

Figure 1:
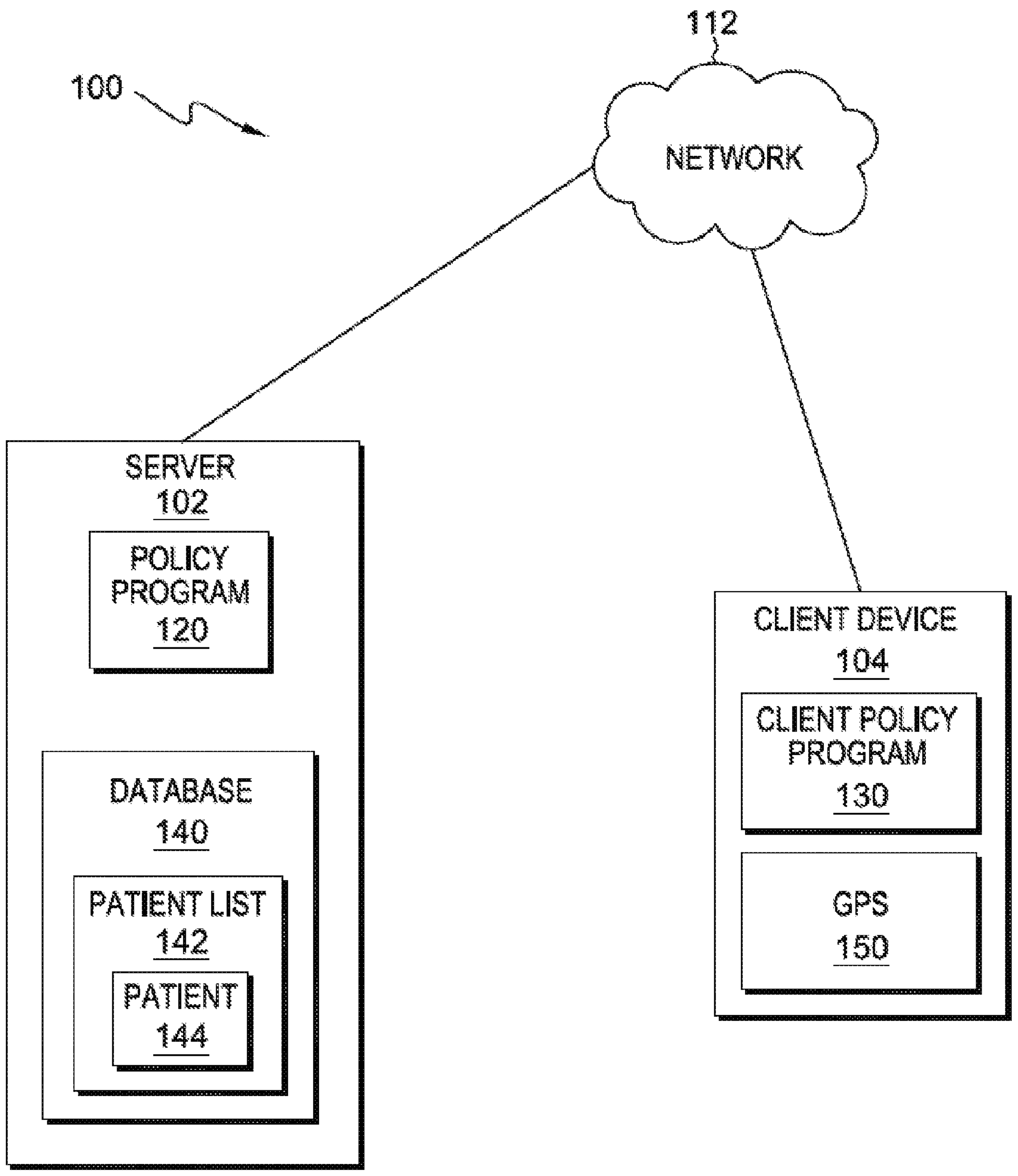
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102 and client device 104, all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 receives and verifies authentication information provided by a user of a client device, another computing device, or any other method known by a person skilled in the art. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client device via network 112. In another embodiment, server 102 represents a computing system utilizing clustered computers and components to act as a single pool of seamless resources. Server 102 may include components as depicted and described in further detail with respect to FIG. 8, in accordance with embodiments of the present invention. Server 102 includes policy program 120 and database 140.

In depicted distributed data processing environment 100, policy program 120 resides on server 102 and stores and verifies authentication information. In various embodiments, policy program 120 receives information from a computing device (e.g., client device 104) containing data pertaining to a specific identification on the computing device (e.g., user name, screen name, etc.) and the location of the computing device, collectively referred to herein as authentication information. In one example, a specific identification may be a password for an employee of a company logging onto a network. In another example, the specific identification may be associated with a specific computing device via an Internet protocol (IP) address, a computing device's serial number, or any other method known in the art for identifying a specific computing device.

In some embodiments, policy program 120 receives a username and password provided by a client device (e.g., client device 104) or some other authentication method known by one skilled in the art, which verifies that the specific identification is the actual user or machine that is trying to access the secure connection. Policy program 120 also receives information pertaining to the physical location of the computing device, such as latitude and longitude coordinates which may have been derived from a global position system (GPS) or any other method known by one skilled in the art. In various embodiments, policy program 120 verifies that the request to access the secure connection, secure information, secure program, secure database (e.g., patient list 142), etc., is coming from a computing device that is within the geographical boundaries designated for access. Policy program 120 is depicted and described in further detail with respect to FIGS. 2 and 3.

In the depicted embodiment, database 140 resides on server 102. In another embodiment, database 140 may reside elsewhere in distributed data processing environment 100, such as within server 102, client device 104, or independently as a standalone database that is capable of communicating with server 102 and/or client device 104 via network 112. A database is an organized collection of data. Database 140 is implemented with any type of storage device capable of storing data that is accessed and utilized by server 102 and client device 104, such as a database server, a hard disk drive, or a flash memory. In other embodiments, database 140 represents multiple storage devices within server 102. Database 140 stores information, such as user names, accounts, passwords, privileged company information (e.g., clients, patients, medical records, brokerage accounts, etc.), and preset geographical boundaries for access to privileged information. In various other embodiments, database 140 may contain authentication information, such as login names, the name of a user, the location of a user, an Internet protocol (IP) address, or any other authentication information known in the art. In an example, database 140 stores a user name, password, and geographical location from which client device 104 is required to login to access an authentication protected program, database, file, etc., such as patient list 142. In another example, all authentication and geographic information is stored by database 140. Database 140 includes patient list 142 and patient 144.

In depicted distributed data processing environment 100, patient list 142 resides on database 140 and is a list of patients that may pertain to a specific doctor of a medical practice or hospital. In some embodiments, patient list 142 may represent a client list for a company or firm that may contain privileged information. In other embodiments, patient list 142 may represent student information for a school or university. In various embodiments, patient list 142 represents privileged or secure information that requires authentication to receive access. In some examples, patient list 142 is made up of multiple individual files, such as patient 144, which may require additional authentication checks. In these embodiments, authentication is managed at least in part by policy program 120. In some embodiments, patient list 142 includes patient 144; while in other embodiments, patient 144 may be a separate file from patient list 142. Patient 144 may comprise patient data, such as visit dates, notes, medical charts, x-rays, billing information, etc.

In the depicted embodiment, client device 104 is one or more of a desktop computer, a laptop computer, a tablet computer, a specialized computer server, a smart phone, or any programmable electronic device capable of communicating with server 102 via network 112 and with various components and devices within distributed data processing environment 100. In general, client device 104 represents any programmable electronic device or combination of programmable electronic devices capable of executing machine readable program instructions and communicating with other computing devices via a network, such as network 112. Client device 104 may include components as depicted and described in further detail with respect to FIG. 8, in accordance with embodiments of the present invention. In an embodiment, client device 104 sends authentication information via network 112 to policy program 120 and is either granted access to secure information located in database 140 (e.g. patient list 142) or denied access to information located in database 140. In an example, client device 104 sends authentication information to policy program 120, which matches the authentication information for client device 104 that is stored in database 140, and policy program 120 grants client device 104 access to patient list 142. Client device 104 includes client policy program 130 and global positioning system (GPS) 150.

In depicted distributed data processing environment 100, client policy program 130 resides on client device 104 and sends requests for access to information that utilizes authentication. In various embodiments, client policy program 130 sends requests to access secure information (e.g., patient list 142) as well as authentication information (e.g., username, password, location of devices requesting access). In one example, a doctor may try to access patient list 142 on client device 104. In this example, client device 104 sends a user name, password, and the physical location of client device 104 to policy program 120. In another example, client policy program 130 authenticates the user's credentials and location before client policy program 130 sends a request for the secure information in database 140 (e.g., patient 44). In some embodiments, client policy program 130 may convert GPS coordinates into a geohash before sending the authentication information to policy program 120. A geohash is a latitude/longitude geocode system which has a hierarchical spatial data structure that subdivides space into buckets of grid shape.

In the depicted embodiment, GPS 150 resides on client device 104. GPS 150 is a space-based satellite navigation system that provides location and time information in all weather conditions, anywhere on or near the Earth where there is an unobstructed line of sight to four or more GPS satellites. In various embodiments, GPS 150 can identify the latitude and longitude of client device 104 via GPS technology, or any other method known by a person skilled in the art.

Figure 2:
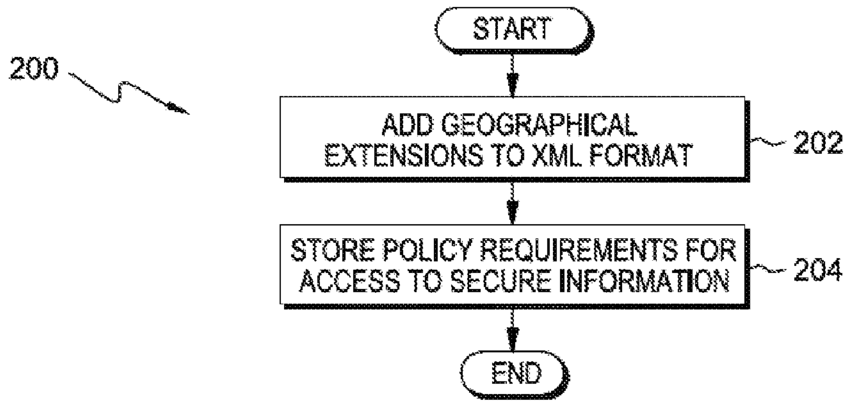
FIG. 2 is a flowchart depicting operational steps of a program for storing policy requirements as well as adding geographical policy into an extensible access control markup language XACML engine within the distributed data processing environment of FIG. 1, in accordance with an embodiment of the present invention.

FIG. 2 is a flowchart depicting operational steps of program 200, which is a function of policy program 120, in accordance with an embodiment of the present invention. Program 200 operates on server 102 and stores policy requirements as well as adding geographical policy into an extensible access control markup language (XACML) engine. In various embodiments, authentication information (e.g., usernames, passwords, and geographical boundaries) for program 200 may be created for the first time to set up an initial account or add additional accounts by users of client policy program 130 or administrators of policy program 120. In some embodiments, geographical parameters are set, which may prevent access to the secure database if the computing device (e.g., client device 104) is not within the preset geographical parameters. In other embodiments, program 200 may only add geographical policy into an XACML engine to create a geospatial XACML engine. In one embodiment, an administrator initiates the operational steps of program 200 to set the geographical parameters and add the geographical policy into an XACML engine. In another embodiment, policy program 120 may initiate the operational steps of program 200 if a large amount of access requests are coming from a specific geographical location that is not within preset geographical parameters for allowing access to secure information.

Program 200 adds geographical extension to XACML format (step 202). In various embodiments, program 200 adds geographical extensions to XACML via data received from a client device (e.g., client device 104) or via an administrator of server 102. In an example, an administrator of server 102 prompts program 200 to make additions to the standard XACML format. In another example, an administrator of server computer 102 adds additional lines to the existing XACML code. In this example, FIG. 4 is the existing XACML code and FIG. 5 is the same code but with geographical extension language added in section 502 of FIG. 5.

In various embodiments, an administrator of policy program 200 can rewrite geospatial (Geo) XAMCL into XACML policy by encoding geographical constraints, which are supported by XACML. In an example, an administrator of program 200 inputs longitude and latitude values that represent points on a map. The points on a map can create shapes, also known as geopolygon (e.g., geopolygon 702 in FIG. 7), which can resemble squares, rectangles, ovals, an outline of a campus or hospital, or any other shape created by the administrator. In this example, program 200 creates geopolygon 702 that represents a boundary area for which program 200 will not allow access to secure information if the computing device (e.g., client device 104) is outside the geopolygon boundary (e.g., geopoint 706). In some embodiments, many different geopolygons may be established that allow access for a user of a client device (e.g., client device 104) which is within one of the geopolygons. In an example, administrators may set geographical boundaries around an office building and each employee's home that should be granted access to the secure information as to enable the employee to work from the office or from home.

In some embodiments, program 200 may convert longitude and latitude into a geohash representation. A geohash is a latitude/longitude geocode system which has a hierarchical spatial data structure that subdivides space into buckets of grid shape. Geohashes offer properties like arbitrary precision and the possibility of gradually removing characters from the end of the code to reduce its size which causes the geohash to lose precision with each character that is removed. As a consequence of the gradual precision degradation, nearby places will often present similar prefixes. The longer a shared prefix is, the closer the two places are. For example, the geohash for the longitude and latitude of 17.39843611, 78.469525 is equivalent to tepfcx7c0rwdjbd5xuxwm. By converting the longitude and latitude numbers into a geohash the space required to store the numbers is reduced.

Program 200 stores policy requirements for access to secure information (step 204). In various embodiments, program 200 stores policy requirements (e.g., which doctor is allowed to access which patient's information from what location; which teacher is allowed to access which student's information from what location; etc.) for access to secure information by a user of a client device (e.g., client device 104) regardless of the user. In an example, program 200 receives information from an administrator of program 200 indicating that a stock broker using client device 104 is only to be granted access to a specific list of clients (e.g., patient list 142) and only certain clients in patient list 142, such as patient 144. Program 200 also receives information from an administrator of program 200 indicating the username and password for a user of client device 104 that correlates to patient list 142 and patient 144, and a geopolygon which client device 104 must be located within to be granted access to patient list 142 and patient 144. In some embodiments, the user of a client device (e.g., client device 104) may create the username and password, but the geographical location and which secure items access will be granted are set by an administrator of policy program 120.

In some embodiments, program 200 may generate geographical boundaries based upon locations known users attempt to access content. For example, nurses attempt to access patient files from a nursing station located in a hospital. In this example, the network is a wired secure network; and therefore, program 200 uses the nursing station location to generate geographical boundaries of nearby areas which may allow access to the same information. In another embodiment, program 200 may generate a new boundary and/or adjust an existing boundary if a threshold number of total attempts to access content are from the same location (s). In an example, a doctor attempts to access content from the doctor's home and the office in 95% of all attempts. In this example, if the doctor's home is not currently within the geographical boundary, but a threshold percent of 95% of attempts are generated from the two locations, and therefore, program 200 generates a new geographical boundary for the doctor's home. In another example, program 200 may allow two locations for access to authentication requiring content. Program 200 may determine which location generates the most attempts to access the content and create boundaries around the two locations. In various embodiments, program 200 may have administrative settings not enabling or overriding adjusting boundaries.

Figure 3:
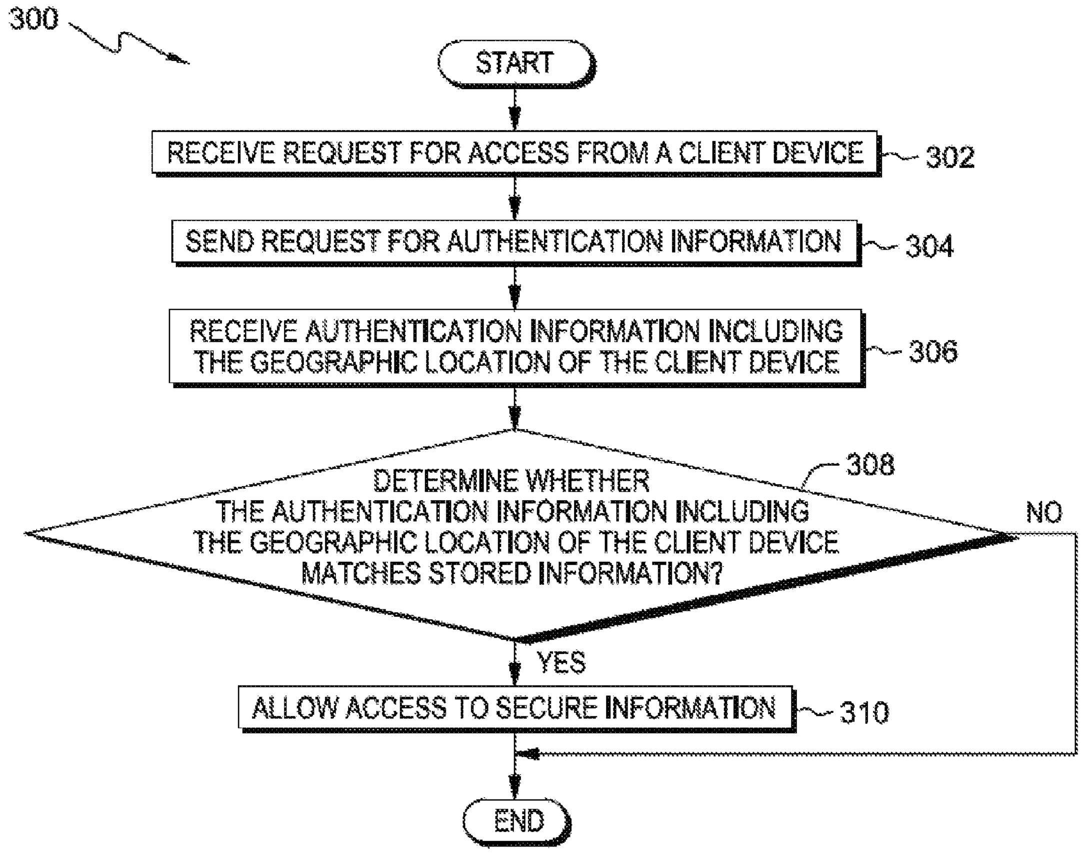
FIG. 3 is a flowchart depicting operational steps of a program for determining if the authentication is valid for an account within the distributed data processing environment of FIG. 1, in accordance with an embodiment of the present invention.

FIG. 3 is a flowchart depicting operational steps of program 300, which is a function of policy program 120, in accordance with an embodiment of the present invention. Program 300 operates on server 102 and determines if the authentication information is valid to grant access to secure information. In various embodiments, the operational steps of program 300 may begin after program 200 has completed step 204. In other embodiments, the operational steps of program 300 may begin each time access is requested to secure information which policy program 120 oversees and/or manages.

Program 300 receives a request for access from a client device (step 302). In various embodiments, program 300 receives a request for access to an authentication requiring program, database, file, etc. (e.g., database 140). In an example, program 300 receives a request from client policy program 130, located on client device 104, to access database 140. In another example, program 300 may receive a request to access policy program 120 or a secure program, database, etc., located on another computing device (not depicted), but the secure program, database, file, etc., is managed by policy program 120. In various embodiments, the request for access to secure information (e.g., database 140) may include authentication information, which may be provided by client policy program 130; and therefore, program 300 may skip to step 306.

Program 300 sends a request for authentication information (step 304). In some embodiments, program 300 sends a request for authentication information to the computing device (e.g., client device 104) that sent the initial request for access to the secure program, database, file, etc (e.g., patient list 142). In an example, program 300 sends client device 104 and/or client policy program 130 a request for authentication information, such as a username, a password and geographical location of client device 104.

Program 300 receives authentication information including the geographical location of the client device (step 306). In some embodiments, program 300 receives a username, password and a geographic location (e.g., longitude and latitude coordinates) of the computing device sending the authentication information. In an example, program 300 receives data from client policy program 130 indicating a username of a doctor, a password, and the geographic location of client device 104. In another example, program 300 receives a geohash for the location of the client device. In this example, the geohash was created by client policy program 130 after identifying the latitude and longitude coordinates utilizing GPS 150. In one example, program 300 may receive coordinates from client device 104 in an XACML file format. For example, FIG. 6 depicts section 602 showing latitude and longitude coordinates. In this example, section 602 contains the geopoint also referred to as the geographical location. Section 602 contains the longitude and latitude coordinates before the coordinates have been converted into a geohash.

Figure 7:
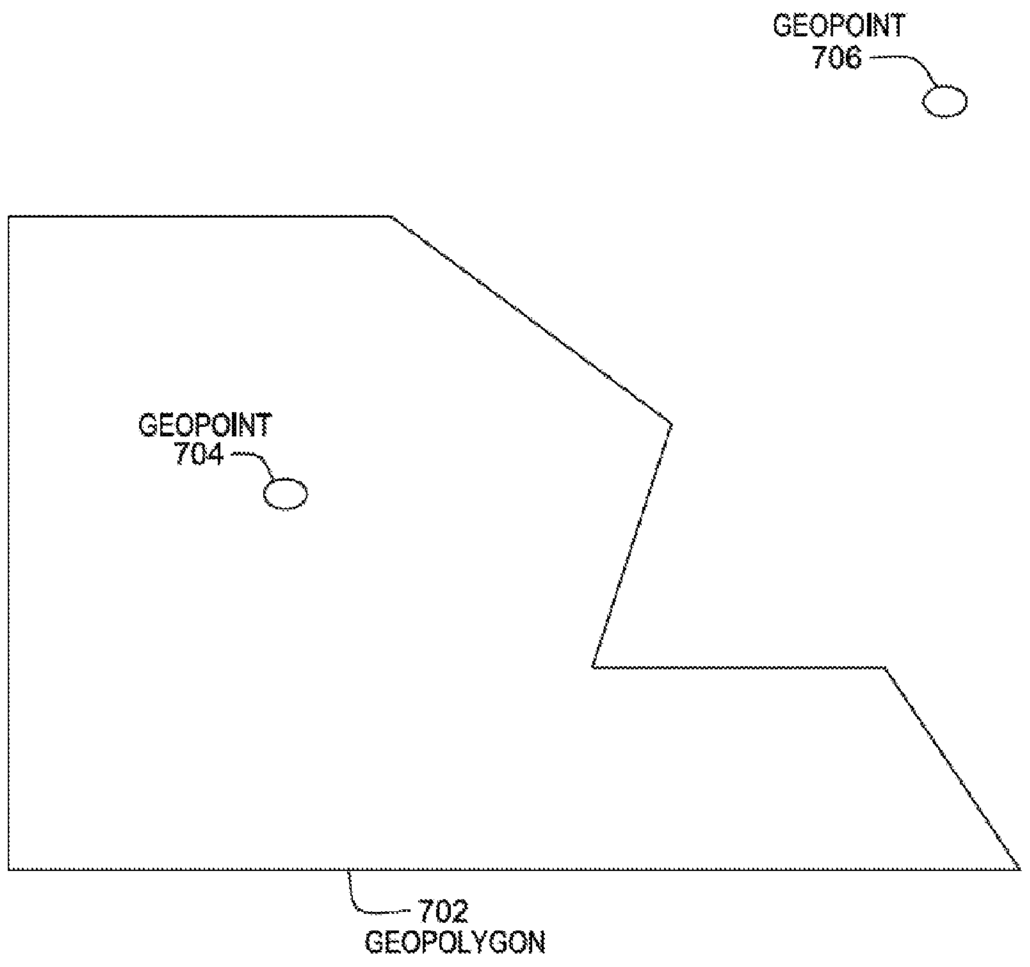
FIG. 7 depicts a preset geopolygon for which access to a secure network is granted within the geopolygon's boundaries, in accordance with an embodiment of the present invention.

Program 300 determines whether the authentication information including the geographical location of the client device matches stored information (decision 308). In various embodiments, program 300 determines if the received authentication information from client device 104 matches information stored in a database (e.g., database 140). In an example, program 300 identifies the geopoint or geohash from the received information. Program 300 then determines if the geopoint is within the predetermined area for access (e.g., geopolygon, preset area of a campus, etc.). In various embodiments, program 300 determines if the received geopoint is within the geopolygon by determining the location of the received geopoint and plotting the received geopoint on a map to determine if the geopoint falls within the geopolygon. In an example, FIG. 7 depicts geopolygon 702 that represents an office campus geopolygon. Program 300 may determine that a geopoint is within the previously set geopolygon. To further the example, geopoint 704 matches the authentication information for the required geographical location of a client device (e.g., client device 104), but geopoint 706 does not match the authentication information for the required geographical location of a client device.

In various embodiments, each time a client device and/or client policy program 130 requests access to secure information (e.g., patient list 142, patient 144), program 300 utilizes a submission of the geographical location for the device sending the request (e.g., client device 104). In one embodiment, the user name and password may stay logged in and therefore, not be required to access the secure information, but the geographical information is still required for each request. In one example, if a doctor logs into a network on a mobile computing device (e.g., client device 104) and then walks outside the preset boundary (e.g., geopolygon 702) for access to the secure information (e.g., patient list 142). In this example, the doctor would not be able to access the secure information. In some embodiments, program 300 determines if a username and password match by methods previously known by one skilled in the art.

If program 300 determines that the authentication information matches previously stored authentication information including the geographical location of the client device (yes branch, decision 308), then program 300 allows access to secure information (step 310). In an embodiment, program 300 determines that the authentication information received from the client device (e.g., client device 104) matches the authentication information previously stored (e.g., information from database 140) for secure information (e.g., patient list 142) and allows the client device to access the secure information, database, file, etc. (e.g., patient list 142). In an example, the username, password, and geographical location of the client device received by program 300 match previously stored authentication information. Program 300 then grants access to the requested secure information (e.g., patient list 142) located on server 102. Program 300 may make the matching determination based on information that is stored in a database, such as database 140, another database either on the same computing device, or another computing device. In this example, program 300 allows client device 104 access to the secure information in database 140, such as patient list 142.

If program 300 determines that the authentication information does not match previously stored authentication information (no branch, decision 308), then program 300 ends. In an embodiment in which program 300 determines that the authentication information does not match previously stored authentication information, such as authentication information in database 140, then program 300 ends. In another embodiment, if program 300 determines that the authentication information does not match previously stored authentication information, then program 300 may proceed to step 304. In various embodiments, if program 300 determines that the authentication information does not match previously stored authentication information, program 300 may alert an administrator of policy program 120 and/or the secure information.

FIG. 4 depicts a generic XACML format, in accordance with an embodiment of the present invention. FIG. 4 is an example of a standard XACML policy file.

FIG. 5 depicts an XACML format which includes geospatial parameters, in accordance with an embodiment of the present invention. FIG. 5 depicts the XACML policy file from FIG. 4, which has been converted to enable use as a GEOXACML policy file. Section 502 represents additions to the standard XACML policy file from FIG. 4.

FIG. 6 depicts received data in an XACML format that indicates the geospatial location of a client device which is trying to access secure information, in accordance with an embodiment of the present invention. FIG. 6 depicts an example of a user location coordinate in an XACML formation which may be sent from a client device to a server. Section 602 is an example of the location of a client device including coordinates.

FIG. 7 depicts a preset geopolygon for which access to a secure network is granted within the geopolygon's boundaries, in accordance with an embodiment of the present invention. FIG. 7 is an example representation of a geopolygon (e.g., geopolygon 702) showing an outline of a geopolygon and locations within the geopolygon boundries (e.g., geopoint 704) as well as outside the geopolygon boundaries (e.g., geopoint 706).

Figure 8:
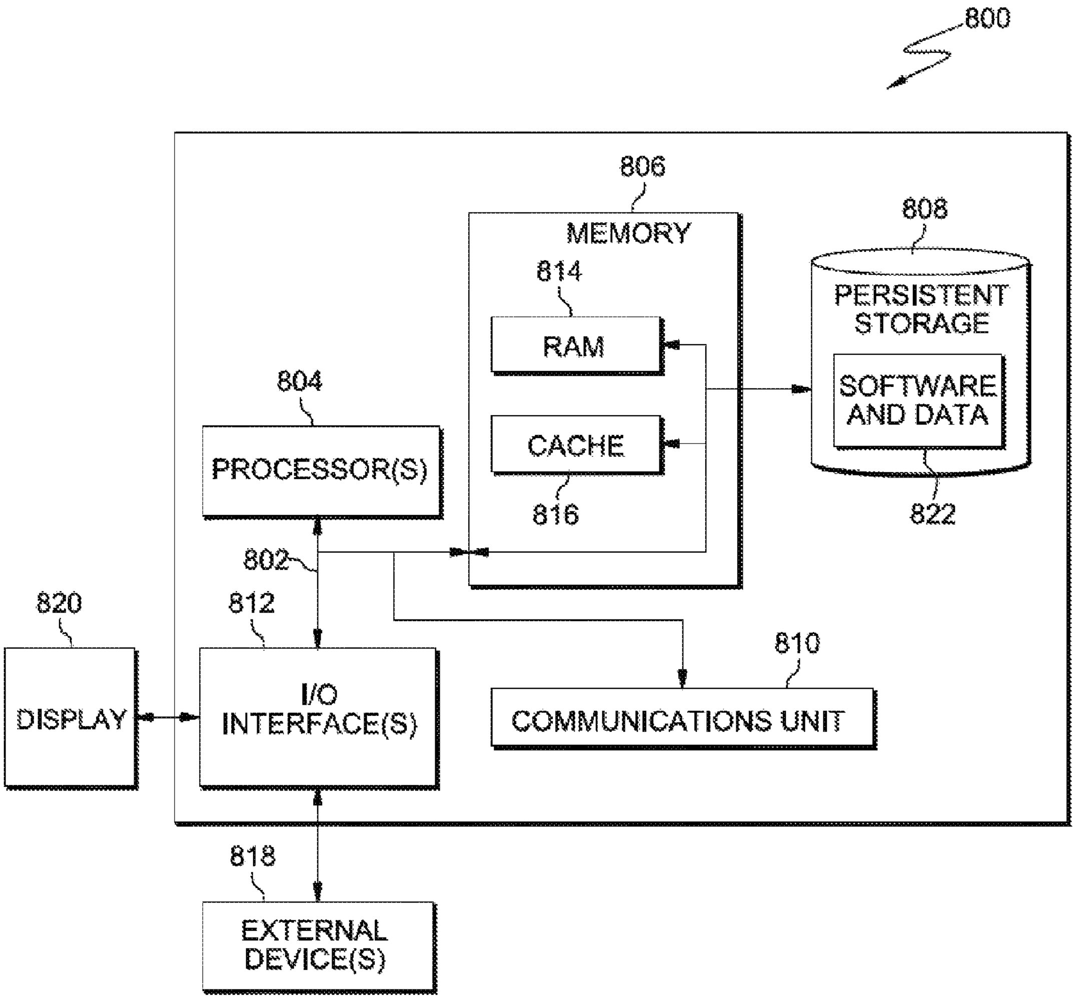
FIG. 8 depicts a block diagram of components of a client device and a server of FIG. 1, in accordance with an embodiment of the present invention.

FIG. 8 depicts a block diagram of components of computer 800, which is representative of server 102 and client device 104, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computer 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications, and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 814 and cache memory 816. In general, memory 806 can include any suitable volatile or non-volatile computer readable storage media. Software and data 822 are stored in persistent storage 808 for access and/or execution by processor(s) 804 via one or more memories of memory 806. With respect to server 102, software and data 822 represents policy program 120 and database 140. With respect to client device 104, software and data 822 represents client policy program 130.

In this embodiment, persistent storage 808 includes a magnetic hard disk drive. Alternatively, or in addition to a magnetic hard disk drive, persistent storage 808 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Software and data 822 may be downloaded to persistent storage 808 through communications unit 810.

I/O interface(s) 812 allows for input and output of data with other devices that may be connected to computer 800. For example, I/O interface(s) 812 may provide a connection to external device(s) 818 such as a keyboard, a keypad, a touch screen, and/or some other suitable input device. External device(s) 818 can also include portable computer readable storage media such as, for example, thumb drives, portable optical or magnetic disks, and memory cards. Software and data 822 can be stored on such portable computer readable storage media and can be loaded onto persistent storage 808 via I/O interface(s) 812. I/O interface (s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for authentication, the method comprising:

identifying, by one or more computer processors, a mobile computing device attempting to access content;

receiving, by one or more computer processors, a username and a password from the mobile computing device;

identifying, by one or more computer processors, a first geopolygon that is associated with the content, wherein the first geopolygon defines a first set of longitudinal and latitudinal coordinates, and wherein the mobile computing device is permitted to access the content from within the first geopolygon;

determining, by one or more computer processors, longitudinal and latitudinal coordinates of a location from which the mobile computing device attempted to access the content;

converting, by one or more computer processors, the longitudinal and latitudinal coordinates of the location from which the mobile computing device attempted to access the content into an extensible access control markup language; and in response to determining, by one or more computer processors, (i) that the received username and the received password match authentication information that is associated with the mobile computing device, (ii) that the longitudinal and latitudinal coordinates of the location from which the mobile computing device attempted to access the content are not within the first geopolygon, and (iii) that the mobile computing device has made a threshold count of total attempts to access the content:

defining, by one or more computer processors, a second geopolygon such that (i) the second geopolygon encompasses the longitudinal coordinates of the location from which the mobile computing device attempted to access the content, and (ii) ninety-five percent of the threshold count of attempts to access the content from the mobile computing device originated from within the first geopolygon and the second geopolygon;

associating, by one or more computer processors, the second geopolygon with the content such that the mobile computing device is permitted to access the content from longitudinal and latitudinal coordinates within the second geopolygon;

converting, by one or more computer processors, the second set of longitudinal and latitudinal coordinates into an extensible access control markup language; and granting, by one or more computer processors, the mobile computing device access to the content based, at least in part, on the location from which the mobile computing device attempted to access the content.

* * * * *